May 1, 1962 R. J. WILSON 3,031,940
CAMERA

Filed Sept. 4, 1958 3 Sheets-Sheet 1

INVENTOR
RICHARD J. WILSON
BY
ATTORNEY

May 1, 1962 R. J. WILSON 3,031,940
CAMERA
Filed Sept. 4, 1958 3 Sheets-Sheet 2

INVENTOR
RICHARD J. WILSON
BY
J. Albert Hultquist
ATTORNEY

May 1, 1962 R. J. WILSON 3,031,940
CAMERA

Filed Sept. 4, 1958 3 Sheets-Sheet 3

INVENTOR
RICHARD J. WILSON
BY
ATTORNEY

United States Patent Office 3,031,940
Patented May 1, 1962

3,031,940
CAMERA
Richard J. Wilson, Sturbridge, Mass., assignor, by mesne assignments, to Sylvania Electric Products Inc., Wilmington, Del., a corporation of Delaware
Filed Sept. 4, 1958, Ser. No. 758,969
2 Claims. (Cl. 95—64)

The present invention relates to photographic cameras and more particularly to cameras in which the exposure is automatically determined by the effect of incident light falling on a photoelectric cell forming a part of the camera mechanism.

An object of the present invention is to provide the user of such camera with a continuously visible indication of the amount of light received by the film in the camera.

Another object of the present invention is to provide a convenient indication of insufficient or excessive light conditions for proper exposure.

Still another object of the present invention is to provide for direct optical observation of the operation of an automatic photoelectrically controlled diaphragm of a photographic camera.

The foregoing objects and others which may appear from the following detailed description are attained in accordance with principles of the present invention by the provision, in a photographic camera having a photoelectric cell and a galvanometer motor coupled thereto and to the diaphragm of the camera, of an optical train running from the view finder to a screen bearing indicia representative of various settings of said diaphragm by way of a movable mirror coupled to said motor. As the galvanometer motor rotates, the mirror swings to scan the optical axis of said train across the screen. I prefer to apply distinctive colors to the end fields of the screen so that the operator is instantly warned by the appearance of colored images either in the view finder itself or in a special field adjacent the field of view but still within the finder that the available light is either too small or too great for proper picture taking. In addition, *f* stop numbers or further color fields representative of *f* stops may be interspersed between the end fields so that the operator may be constantly appraised of the actual stop number in use when the camera is in operation.

Figure 1:
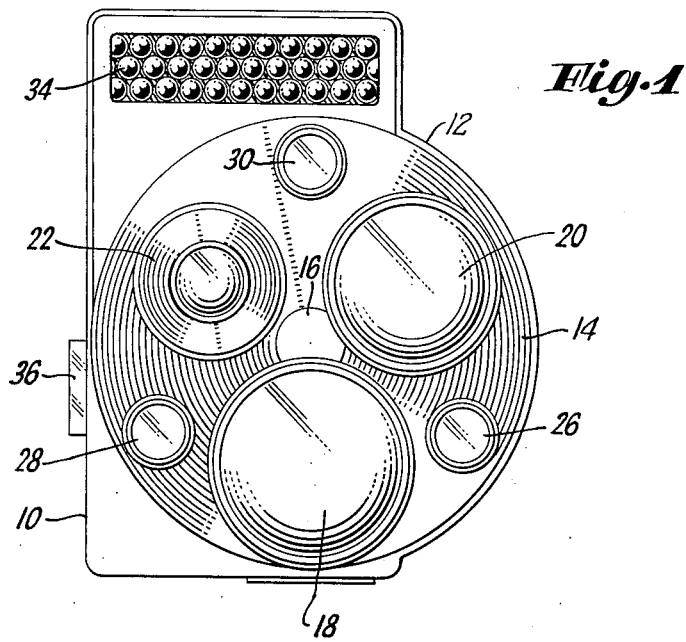
Figure 2:
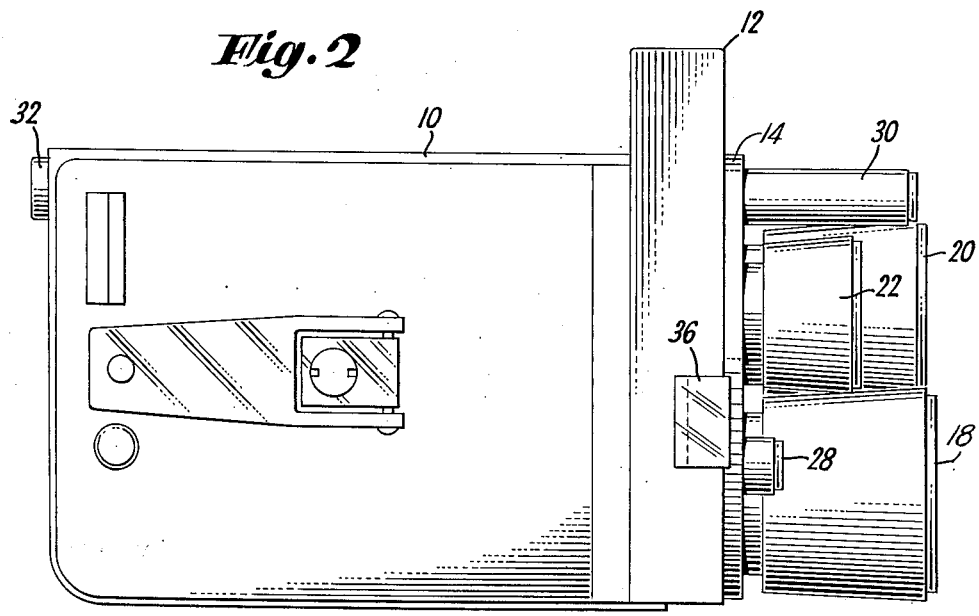
Figure 3:
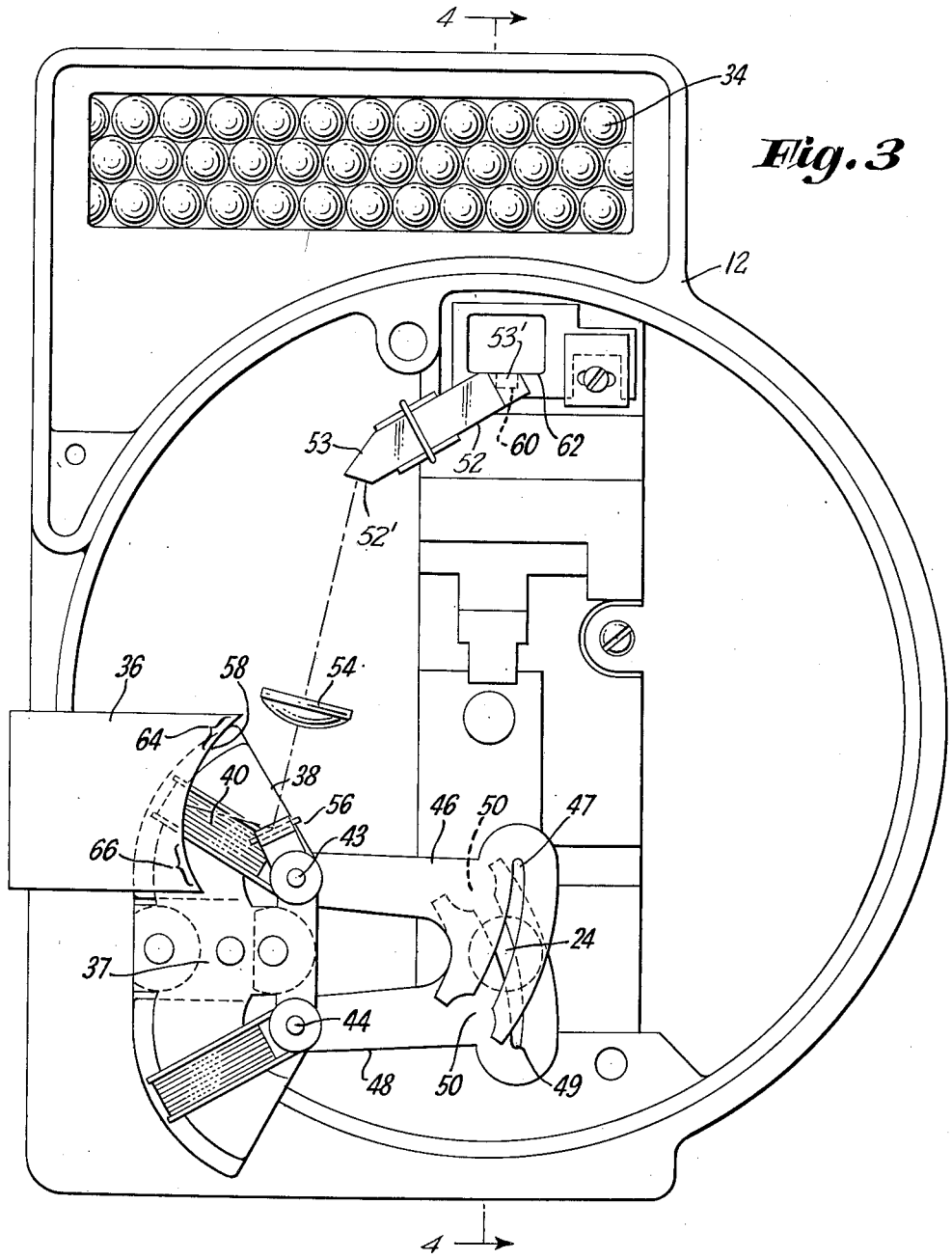
Figure 4:
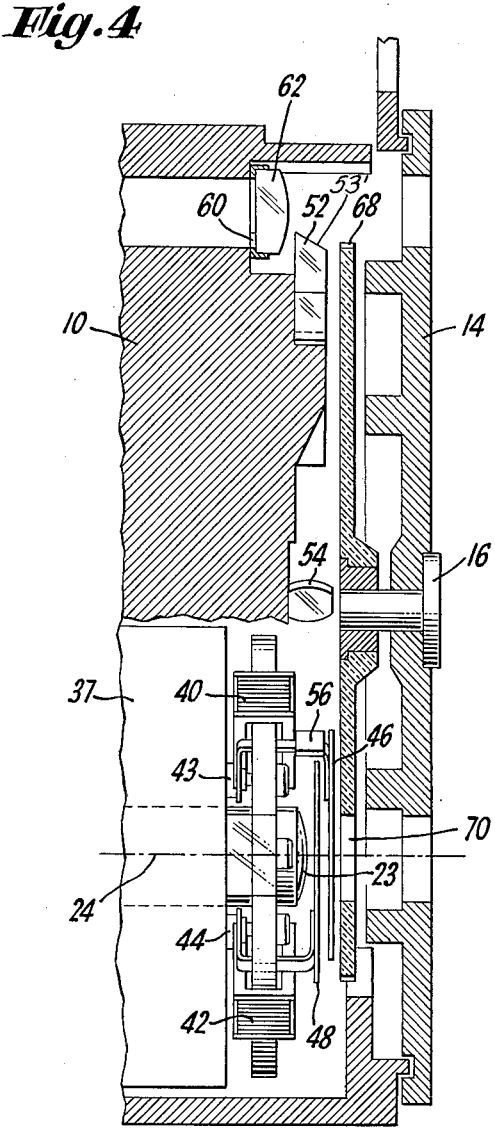

The invention will become fully understood by reference to the following detailed description accompanied by drawings in which FIGURE 1 illustrates an end view of a camera embodying principles of the present invention while FIGURE 2 is a side view of said camera and FIGURE 3 is an end view of the camera similar to FIGURE 1 but with certain parts removed in order to show the interior construction behind the lens turret and FIGURE 4 is a fragmentary section taken along line 4—4 of FIGURE 3.

In FIGURES 1 and 2, there is shown in front and side elevations a movie camera containing an embodiment of the present invention. The camera includes a generally rectangular box-like casing 10. Within casing 10 is included space for a roll or cartridge of movie film, a film gate through which the film passes when it is exposed, a shutter mechanism and a spring motor or other means for driving the shutter and advancing the film. None of these latter parts are shown in this drawing since they do not directly enter into the operation of my invention and are conventional in the art.

The front end of the camera is provided with a generally drumshaped casing 12 having a rotatable lens turret 14 mounted over its open front end. Turret 14 is arranged to be rotated about pivot 16 to bring any one of a number of different lenses 18, 20 and 22 into operative relationship with lens 23 (FIG. 4) along the optical axis 24 of the film exposure gate. Each of lenses 18, 20 and 22 individually with lens 23 forms a complete "taking" objective.

Turret 14 is also provided with a number of view finder lenses 26, 28 and 30. Each view finder lens is matched to one of the taking objectives so that when, for example, lens 18 is in position in front of the film gate view finder lens 30 provides in the view finder lens 32 an indication of the field of view exposed to the film by lens 18.

Facing forwardly of the camera and generally responsive to the same light as imaged through any one of the objective lenses 18–22 is a photoelectric cell 34. Cell 34 generates an electric current generally proportional to the amount of light falling upon its front surface.

The camera is also provided with a side window 36 made of glass, methyl methacrylate or other transparent light conducting material. Light falling on this window from either the front, top or side of the camera is conducted to within the space back of turret 14 for a purpose to be explained hereinafter.

In FIGURE 3 the lens turret has been removed and parts of the casing 10 broken away to disclose the structure therebehind with which my invention is concerned. This includes an electric motor 37 of the d'Arsonval galvanometer type having a permanent magnet 38 producing a magnetic field in which wire windings 40 and 42 are at least partly immersed so that as a current flows through the windings they are urged to move about pivots 43 and 44, respectively. The current causes winding 40 to move in a clockwise direction, and 42 in a counter-clockwise direction. The current is supplied by wiring connections, not shown, from photoelectric cell 34. Hair springs (not shown) are connected to coils 40 and 42 urging winding 40 to rotate in a counterclockwise direction and winding 42 in a clockwise direction.

Diaphragm blade 46 is rigidly secured to coil 40 to pivot with it about pivot 43 and diaphragm blade 48 is similarly associated with coil 42. They swing in closely adjacent parallel planes normal to the axis of pivots 43, 44 and also normal to the optical axis 24.

Diaphragm blades 46 and 48 are each provided with a tapered arcuate slot, 47 and 49, respectively, centered radially through optical axis 24. Each slot terminates at its wider end in a semi-circular aperture 50. Thus when there is no current passing through the coils the diaphragm blades swing away from each other and a circular aperture at least as large as the maximum *f*-stop or aperture of the lens system is centered about axis 24. Current flowing from the photoelectric cell causes blades 46 and 48 to move toward each other against the urging of the hair springs and the crossing arcuate slots form a generally rectangular aperture centered about axis 24 and having an area inversely proportional to the amount of light falling on cell 34. Thus at a given shutter speed and for a given film speed a proper exposure can be given to the film, within limits, no matter how the light falling upon the scene being photographed changes. However, it is desirable to give the operator of the camera warning when the exposure is inadequate, such as when the semi-circular apertures 50 are in front of the lens or when the amount of light is so great that the aperture found by the small ends of slots 47 and 49 still results in overexposure.

This is accomplished by providing an optical train running from the view finder 32, through prism 52, lens 54, mirror 56 mounted to pivot about the axis of pivot 43 and coupled to coil 40 and curved screen 58 on the inner face of window 36 acting as a means to illuminate screen 58 from the exterior of the camera.

Prism 52 receives a light ray axial of the optical train from mirror 56 and lens 54 through face 52′. The ray is totally internally reflected at face 53 and passes along the length of the prism until it strikes face 53' where it is again totally internally reflected toward the rear of the camera into aperture 60 immediately adjacent to and below window 62 of view finder 32.

Lens 54 has such focal length and is so positioned as to focus an image of a portion of screen 58 in aperture 60, said portion being determined by the position of mirror 56.

Thus as mirror 56 swings in accordance with movement of coil 40 the light ray axial of the optical train just described scans over the surface of screen 58 from one end to the other.

End portions 64 and 66 of screen 58 are preferably distinctively colored relative to the central portion, for example red, while the central portion may be white or green. Thus the field at the edge of window 62 may show white or green when the film exposure is proper whereas a red field may indicate gross overexposure or under exposure.

If desired f-stop numbers representative of various predetermined apertures formed by arcuate slots 47 and 49 may be printed, engraved or otherwise formed on screen 58. Then the actual stop number at which a picture is being taken is imaged in window 60.

Since it may be desirable, in some circumstances, to manually set the effective lens aperture to some other value than that determined by the photoelectric cell and motor mechanism, I have provided a manual diaphragm comprising an opaque disc 68 (FIGURE 4), having a series of fixed Waterhouse stops arranged about the diameter of a circle centered at pivot 16 and having a radius equal to the distance between optical axis 24 and pivot 16. One aperture 70 is larger than any attainable by diaphragm blades 46, 48 and is placed in position centered about optical axis 24 when automatic operation is desired. When manual operation is desired a preselected smaller aperture is substituted for aperture 70. A switch, not shown, coupled to disc 68 short circuits motor 37 in all positions of disc 68 except when aperture 70 is in position at optical axis 24. Otherwise it would not be possible to manually select a diaphragm stop larger than that determined by the automatic mechanism comprising photoelectric cell 34 and motor 37. For further details of this portion of the camera reference may be had to a copending application entitled "Automatic Exposure Control", Serial No. 758,430 filed September 2, 1958, by De Loy H. Kelly and Jan A. Van den Broeck and assigned to the assignee of the present application.

In connection with the use of the continuous rainbow spectrum on screen 58 I may use a similar rainbow spectrum on disc 68, observable through an aperture in the camera body so that a predetermined aperture can be selected either larger or smaller than that set by the automatic mechanism.

Having thus described an embodiment of the present invention what I claim is:

1. In a photographic camera having an optical train for imaging a scene upon a sensitized surface and including an adjustable diaphragm in said train, a photoelectric cell, electric motor means coupled to said photoelectric cell and having a movable armature connected to said diaphragm for adjusting the aperture in said diaphragm in accordance with increase or decrease of light falling on said cell, and a view finder having a single eye lens, means for indicating in said view finder the adjustment of said diaphragm including a mirror coupled to said armature for rotation thereby, a screen bearing indicia characteristic of various openings of said diaphragm, means for illuminating said screen from the exterior of said camera and a second optical train including along its axis said screen, said mirror, a lens and a prism for imaging one of said indicia in a field of view at one edge of the field of view of said view finder where it may be viewed through said eye lens.

2. In a photographic camera having an optical train for imaging a scene upon a sensitized surface and including an adjustable diaphragm in said train, a photoelectric cell, electric motor means coupled to said photoelectric cell and having a movable armature connected to said diaphragm for adjusting the aperture in said diaphragm in accordance with increase or decrease of light falling on said cell, and a view finder having a window therein indicating the field of view of said camera and an ocular lens through which said field is visible, means for indicating in said view finder the adjustment of said diaphragm including a mirror coupled to said armature for rotation thereby, a screen bearing indicia characteristic of various openings of said diaphragm, means for illuminating said screen from the exterior of said camera and a second optical train including along its axis said screen, said mirror, a lens and a prism for imaging one of said indicia in a field of view at one edge of the field of view of said view finder viewable through said ocular lens.

References Cited in the file of this patent

UNITED STATES PATENTS

| | | |
|---|---|---|
| 2,058,562 | Buckey et al. | Oct. 27, 1936 |
| 2,297,262 | Tonnies | Sept. 29, 1942 |
| 2,841,064 | Bagby et al. | July 1, 1958 |

FOREIGN PATENTS

| | | |
|---|---|---|
| 855,944 | Germany | Nov. 17, 1952 |